US006819727B1

United States Patent
Cucchi et al.

(10) Patent No.: US 6,819,727 B1
(45) Date of Patent: Nov. 16, 2004

(54) METHOD AND DEVICE FOR THE NUMERIC CONTROL OF THE BUFFER AND OF A PHASE-LOCKED LOOP FOR ASYNCHRONOUS NETWORKS

(75) Inventors: Silvio Cucchi, Gaggiano (IT); Daniele Meli, Nicosia (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/340,204

(22) Filed: Jun. 28, 1999

(30) Foreign Application Priority Data

Jul. 1, 1998 (IT) .................................. MI98A1508

(51) Int. Cl.[7] ................................................ H04L 7/00
(52) U.S. Cl. ...................................................... 375/372
(58) Field of Search ............................... 375/370, 371, 375/372, 373, 376; 370/505, 516; 365/189.01, 189.04, 189.07, 189.05

(56) References Cited

U.S. PATENT DOCUMENTS

| 4,827,225 | A | * | 5/1989 | Lee ............................. 375/376 |
| 5,402,425 | A | * | 3/1995 | Bladh ........................... 375/372 |
| 5,526,362 | A | * | 6/1996 | Thompson et al. .......... 375/376 |
| 6,118,834 | A | * | 9/2000 | Rasanen ....................... 375/372 |
| 6,252,850 | B1 | * | 6/2001 | Lauret .......................... 375/371 |

* cited by examiner

Primary Examiner—Don N. Vo
(74) Attorney, Agent, or Firm—Sughrue Mion, PLLC

(57) ABSTRACT

A method and device is described for the numeric control of buffer and phase-locked loop for the recovery of the synchronism and the optimized management over communication networks having a high jitter like, e.g., networks in which the ATM mode (Asynchronous Transfer Mode), is used. The innovation resides in the buffer management which is carried out according to the input phase statistic characteristics (in part known a priori and in part measured by the system) as well as to its measured value (which is equivalent to the buffer filling level) thus introducing the concept of statistic pointers. This allows an optimal management thereof and also permits to control the buffer overflow and underflow probabilities. Moreover, by associating the present device with another phase locked device, it is possible to obtain a high frequency stability of the reconstructed sync signal, attenuating at a large extent the jitter introduced by the network, even at a very low frequency.

18 Claims, 4 Drawing Sheets

METHOD AND DEVICE FOR THE NUMERIC CONTROL OF THE BUFFER AND OF A PHASE-LOCKED LOOP FOR ASYNCHRONOUS NETWORKS

BACKGROUND OF THE INVENTION

1. Field Of The Invention

The present invention relates to a method and device for the numeric control of the buffer and of a phase-locked loop for asynchronous networks.

2. Background Information

Real time transmission of signals (such as e.g. speech or video signals) through asynchronous networks requires the use of sophisticated buffer control and clock recovery techniques. For instance, communication networks based on packet switching, such as the ATM (Asynchronous Transfer Mode), introduce, at the receive side, a remarkable amount of jitter, just due to the asynchronous nature of the transmission and to delay uncertainties introduced by the network nodes: the typical patterns of such uncertainties are generally known but the related statistical parameters are not.

In order to recover the source sync signal, it is known to use phase-locked loops (PLLs), possibly digital phase-locked loops (DPLLs), along with a buffer for storing the received data to be de-jittered.

A conventional method consists in writing data into memory (buffer), keeping trace of the filling level thereof and locking the PLL to the latter.

For high jitters, it is known to use the technique of the so-called time-stamps, i.e. time information that is periodically transmitted by the transmitter to the receiver(s) along with the useful information (i.e. the payload): such time information, properly processed by the DPLL, hence allows the reconstruction of the signal at the receive side by locking a local clock thereto thus realizing a remote "synchronization". There are, on the other hand, applications in which the time-stamps are not transmitted or are not usable even if transmitted by the source; in fact they are calculated in relation to a frequency, well known at trasmission side, that has to be sent to the receiver: if the latter is not received, the time information is totally useless.

Therefore, the main object of the present invention is to provide a method and device for the numeric control of the buffer and of a phase-locked loop for asynchronous networks capable of overcoming the above drawbacks. In particular, the new method as proposed herein proves to be very useful in those applications where time-stamps are not transmitted or could not be used.

Anyway, it is necessary to provide a buffer control algorithm in order to avoid both the loss of data, if the amount of these exceeds its maximum capacity (overflow), and the lack of data to be supplied to the receiving system if the buffer is empty (underflow).

SUMMARY OF INVENTION

Therefore, the present invention provides a method for the digital control of the buffer which, possibly associated with a digital phase-locked loop, for instance the one covered by a previous patent-right belonging to the same applicant, is able to overcome the above-mentioned drawbacks; particularly, but not exclusively, it provides for an improvement in the performances of the synchronizing block in terms of buffer use optimization, a reduction in the probabilities of overflow and underflow and an excellent jitter rejection even at very-low frequencies.

In order to achieve these objects, the present invention provides a method for the buffer numeric control.

The present invention provides also a device for the numeric control of the buffer.

The present invention further provides a phase-locked loop.

The basic idea of the present invention consists in introducing a buffer which can be termed "virtual" (or addressed using a "virtual pointer") for managing the buffer control system and a loop which provides a digital phase-locking on a statistical basis rather than by means of the actual measure of the input phase.

Among the advantages of the present invention there is the enhancement of the buffer performances while reducing the overflow and underflow probabilities and the increase of the frequency stability of the recovered clock signal.

Further objects and advantages of the present invention will result in being clear from the following detailed description of an embodiment thereof and from the accompanying drawings attached merely by way of illustration and not of limitation.

DETAILED DESCRIPTION OF THE DRAWINGS

In the,various figures of the drawing:

FIG. 3a shows a distribution of the filling level of the buffer completely within the dimensions of the buffer itself while FIG. 3b shows a distribution of the filling level of the buffer extending beyond the dimensions of the buffer itself.

DETAILED DESCRIPTION OF THE PREFERRED EMBODIMENT

Figure 1:
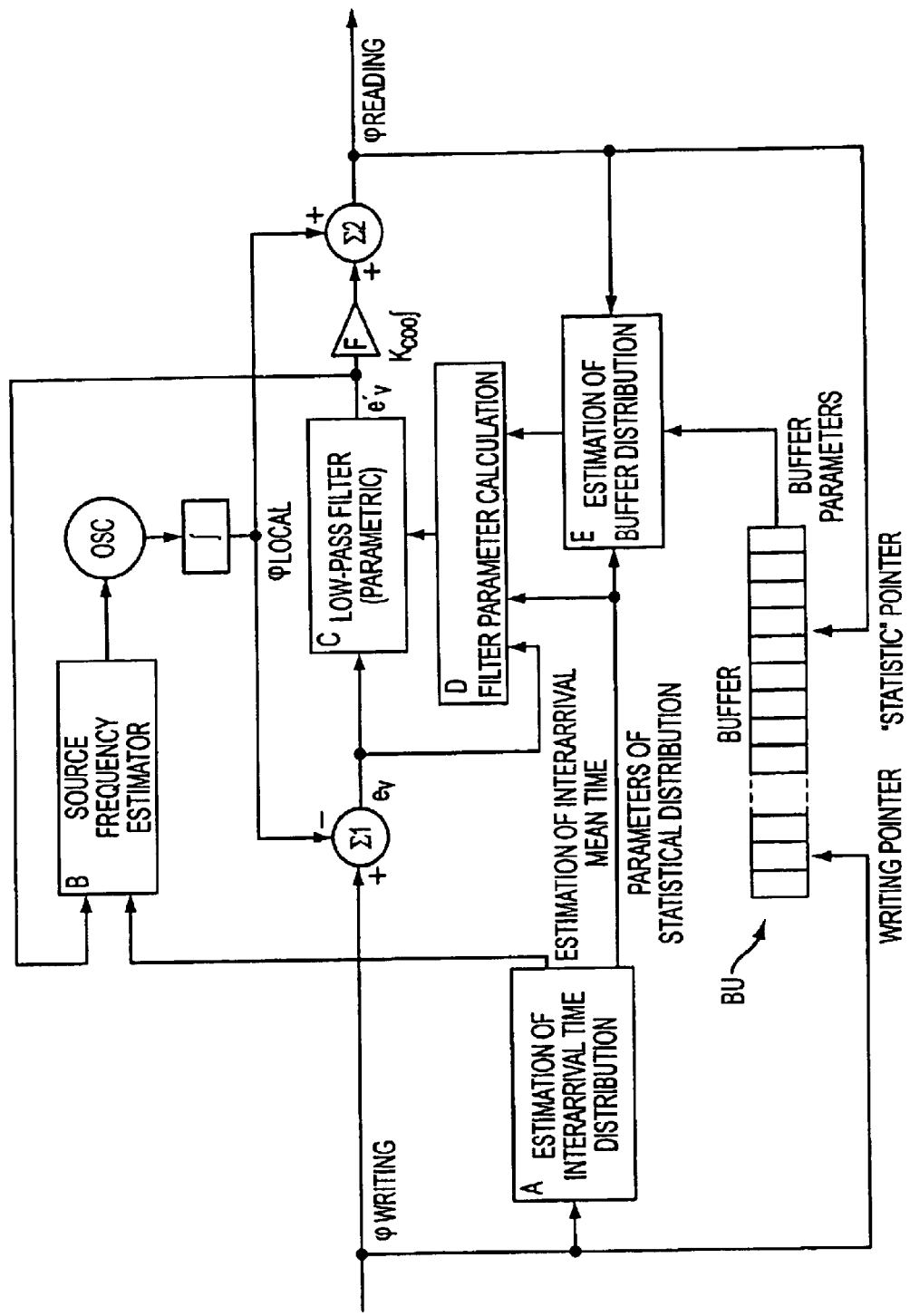
FIG. 1 shows a functional block diagram of the device for the buffer numeric control according to the present invention.

Referring firstly to FIG. 1, the block diagram of the proposed system will be illustrated. It is a good thing to point out right now that in the following description it is assumed to work in ATM environment on SDH (Synchronous Digital Hierarchy) network, without limiting the generality of the proposed solution for that reason, and embodiments of the various blocks will be illustrated, the latters being not restrictions in the realization of the system.

Block F is a multiplier whose multiplying constant $K_{conf}$ may take values from 0 to 1, according to the preselected configuration; in the following description it is assumed that $K_{conf}=0$, other configurations will be described later on.

Block A carries out a distribution estimation of the interarrival times (i.e. substantially the time intervals between the arrival of a datum, or a data set, and the subsequent one) based upon the input phase $\phi_s$, i.e. upon the writing times of data coming into the buffer. It substantially allows the selection of one type of distribution, among n possible distributions, which is assumed to be the received data flow distribution; by accumulating subsequent measures of the input phase, the knowledge of the type of distribution is deepened and its characteristic parameters (average, variance, etc.) as well as an estimate of the source frequency are computed. The source frequency estimate is sent to block B which will be described later on, while the statistical distribution parameters are sent to blocks D and E which will be defined later on, too.

For the computation of the statistical distribution, one of the methods known from the literature, like e.g. the one based on histograms, can be used: through such a method, that will be described below, the subsequent measurements of the interarrival times are carried out and stored in a vector containing the "history" of the measures.

First of all, one establishes the range (e.g. the interval [a,b)) within which the measures should be kept: this is necessary both because the distributions at stake are significant about the mean value and within 3–4 times the standard deviation, on the contrary, for values far from 4–5 times the standard deviation the probabilities become very small, and also because the vector in which the measures are to be stored must obviously have a finite number of elements.

The measure interval is partitioned into N subintervals having the same amplitude (equal to L=(b−a)/N in the present example): this means that, in effect, the statistic distribution will be constructed by means of a step approximation of the real distribution, for the same reason of the preceding point. The interval will be partitioned as follow:

$$[a,a+L) \cup [a+L,a+2L) \cup [a+2L,a+3L) \cup \ldots$$
$$\ldots \cup [a+(N-2)L,a+(N-1)L) \cup [a+(N-1)L,b);$$

by taking the ends of the distribution into consideration, it is possible to include the intervals (−∞,a) and [b, +∞) thus obtaining a partition of the type $$(-\infty,a+L) \cup [a+L,a+2L) \cup [a+2L,a+3L) \cup \ldots$$
$$\ldots \cup [a+(N-2)L,a+(N-1)L) \cup [a+(N-1)L,+\infty);$$

A N-element vector isto[N] is then used, each element being able to collect the histogram value occourences of the corresponding interval. Before starting the measurements, all the vector elements are initialized to the value 1/N: i.e. the start point is a uniform distribution (note that, in order to accelerate the algorithm convergence, it is possible to initialize the distribution to "characteristic" values according to the assumed initial typology).

Therefore, for each measure x belonging to the subinterval i (hence associated with isto[i]) one carries out:

$$isto[j] = isto[j] * (1 - \alpha), \quad \forall j \neq i$$
$$isto[i] = 1 - \sum_{\forall j \neq i} isto[j],$$

where α the leakage factor, i.e. the histogram updating rate. By means of such a calculation, a normalized distribution is obtained, whereby it is always true that $$\sum_{\forall j} isto[j] = 1$$

The so-obtained distribution approximates by steps the input signal distribution (more precisely, therefore, it approximates a certain realization of a certain process which is thought to be stationary).

Given the distribution, it is then easy to deduce its type and the related statistical parameters which are necessary. In particular, the reciprocal of the interarrival time mean value represents an estimate of the source transmission frequency.

It is pointed out how the prior knowledge of some characteristic factors of the network makes it possible to establish whether the calculated quantities are valid or not: for instance, knowing that the source frequency may change with respect to its nominal value within a determined precision and the computed value is out of the admitted range, one can infer that the system has not reached the necessary precision yet, and the nominal value, or anyway one of the admissible values, will be used for the quantity at stake.

Block B is defined as a frequency estimator and substantially it calculates the frequency (and therefore the phase) of the local digital oscillator OSC (which is not physically existing but it is simulated). It calculates the frequency of the oscillator by using the interarrival time distribution estimate and the residual error $e'_\phi$ still present downstream of the low-pass filter C. In the embodiment described herein it is an IIR filter operating on the interarrival average time estimates, with an input/output relation of the type $$T[n] = (1-\alpha) * T[n-1] + \alpha * T_A$$

where T[i] designates the interarrival average time estimate at the i-th iteration, $T_A$ designates the estimate provided by block A and α is a parameter adjusting the passband of the filter; the latter takes a certain initial value and then decreases with time to a much lower asymptotic value (e.g. from 1 to $10^{-9}$), for instance according to the law:

$$\alpha[n] = (1-\gamma) * \alpha[n-1] + \gamma * \alpha_\infty$$

where $\alpha_\infty$ is the asymptotic value and γ is the "narrowing rate" of the filter band.

Keep in mind that it is possible to use, at first, a FIR filter and then, after a number of iterations, the above described IIR filter.

The average time estimation filter also has to take account of the limitations imposed by the knowledge of the source & network system. Since the source frequency $F_s$ is known with a certain accuracy, $\Delta F_s$ is also known, and therefore one has a similar knowledge of the inter-transmission times, it is obvious that block B should not take into account estimates T[i] which take the estimated source frequency $f_s$ out of the admitted range (i.e. when $f_s > F_s + \Delta F_s$ or $f_s < F_s - \Delta F_s$), by carrying out suitable limitations: for this reason the knowledge of the residual phase error value $e'_\phi$ is also necessary.

Block C is a high-parametrical, adaptive low-pass filter whose function is to filter the ATM cell jitter (let $T_s$ be the source transmission period, $t_{arrival}[n]$ the n-th ATM cell arrival time and Δ the average delay of the network, the cell jitter is defined by $j[n] = t_{arrival}[n] - n * T_s - \Delta$). The filtering parameters, and therefore the bandwidth, are set by block D, which calculates the filter parameters, and block E, which carries out an estimation of the distribution of the buffer BU on the basis of the statistical distribution parameters from block A.

Located upstream of filter C is an algebraic summer Σ1 which computes the phase error $e_\phi$, the larger the jitter introduced by the network, the greater its dynamics will be.

The output of filter C is the residual phase error $e'_\phi$ of the system: under ideal conditions, i.e. perfect estimation of the input distribution, it still has a residual jitter due exclusively to the source and not to the network. The subsequent summer Σ2 gives back a read phase $\phi_1$ of the buffer BU (statistical pointer) without network jitter which, in the configuration analyzed with $K_{conf}=0$, depends only upon the estimation of block B. If necessary, the residual jitter, due to the source only, could be effectively eliminated by a PLL (not shown) inserted downstream of the whole system, using the same physical buffer of the illustrated system.

The factors taken into account by blocks D and E comprise:

a) the distribution of the interarrival times; b) the filling level of the buffer; c) the overflow and underflow error probability; d) the degree of exploitation of the buffer.

One of the innovations of this system consists in the optimal utilization of the buffer: for instance, having a certain amount of storage utilized as a buffer, it is used as much as possible, trying to keep the "filling level" r, otherwise termed as "level of use", (hereinafter understood according to the definition r=d/C—see FIG. 4—which will also be given later on) within predetermined thresholds (e.g. within 60÷80%). Imposing an under-utilization of the buffer, by exploiting only a small percentage (e.g. less than 50%), may entail an excessive widening of the passband of the filter, with a consequent increase of the output residual jitter. On the contrary, trying to use it above the maximum pre-established threshold (e.g. 90%) may entail an high underflow/overflow error probability.

The definition of "buffer distribution", which is essential for the description of the low-pass filter (FIG. 2) is given below. Lets assume: a) writing into the buffer at a rate equal to the receiving one; b) reading out of the buffer at a constant rate equal to the source nominal rate; c) having at disposal a buffer large enough to avoid overflow condition.

Figure 2:
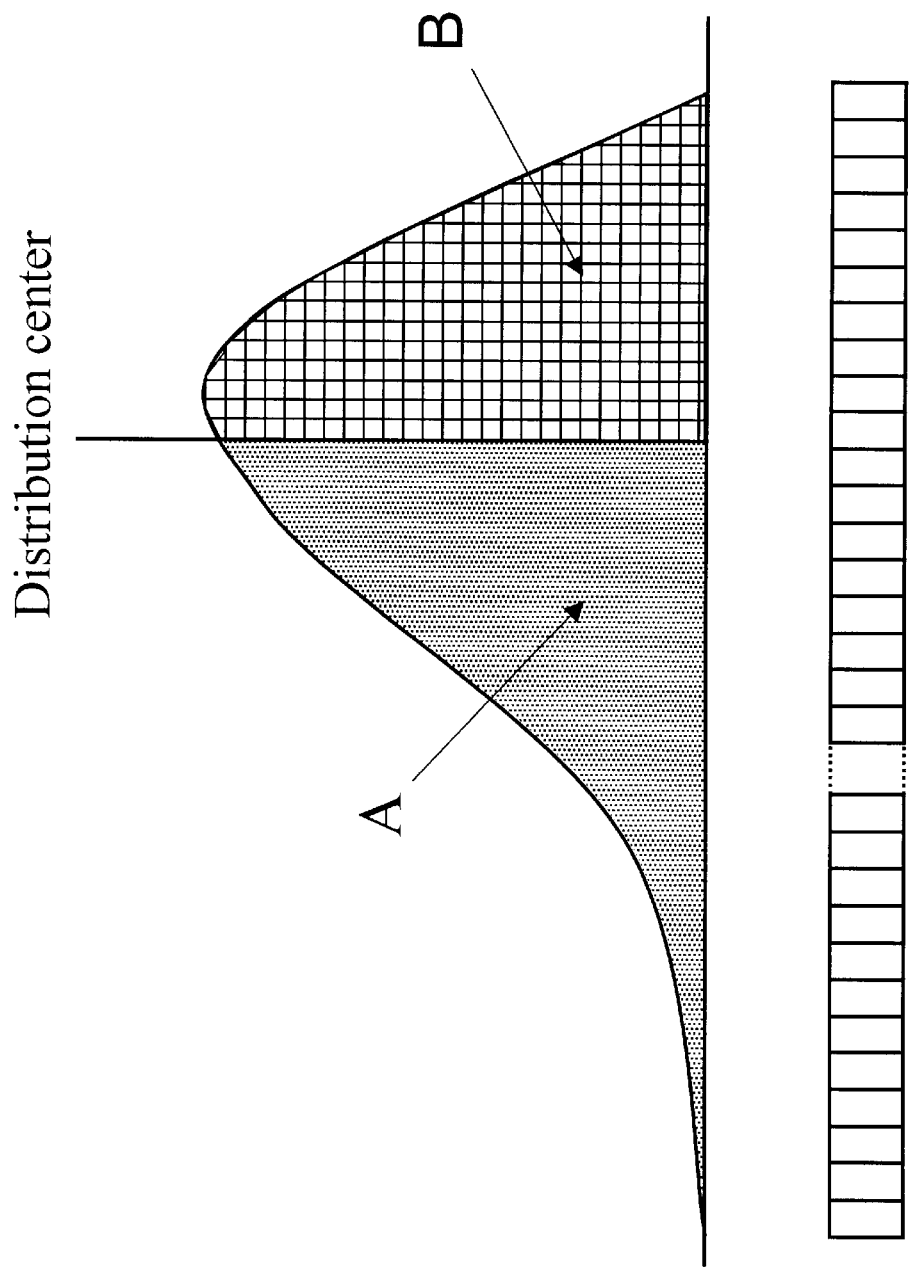
FIG. 2 shows a centered distribution of the filling level of the buffer.

Then, the "buffer distribution" is referred to as the distribution of the filling level of the buffer centered with respect to its dimension. "Centered" here refers to the fact that the probability of filling a portion of the buffer (FIG. 2, area A) coincides with the one of the other portion (FIG. 2, area B) with respect to the statistical average. The center of the distribution is clearly indicated by a vertical line. Therefore, when one refers to the "center of the distribution" (or to the center of the buffer) reference is not made to the physical dimension (50% of the storage dimension), but to the probability (50% of the probability). Operatively, when the buffer is full up to the center point, a further filling thereof has the same probability of a further depletion thereof. It is to be noted that, e.g. for ATM networks, the physical center hardly ever coincides with the probabilistic center.

Figure 3:
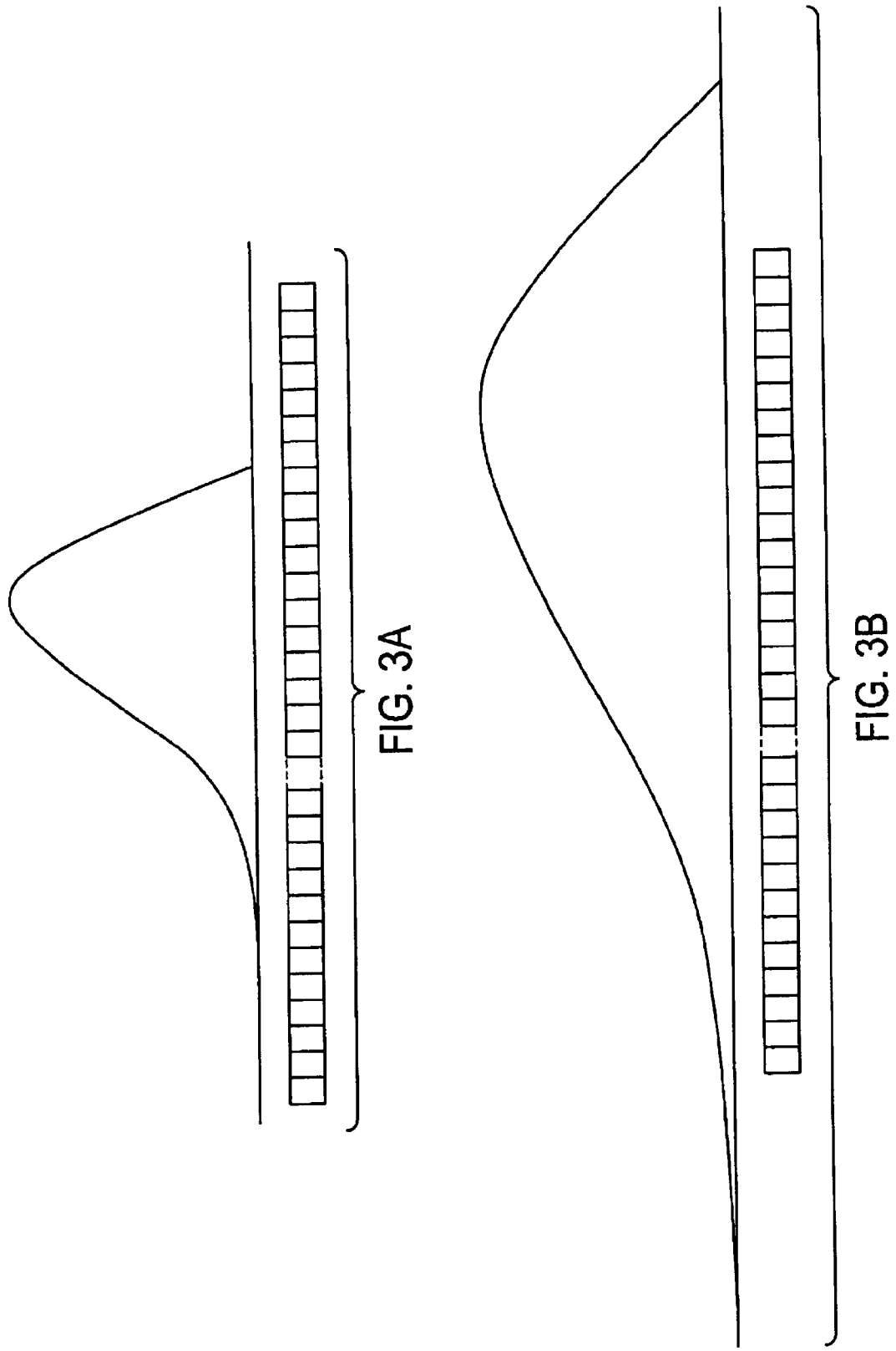

Moreover it is to be noted that, given a dimension of the buffer, two different relations between the latter and its distribution are possible, as illustrated in FIG. 3. In the first situation (FIG. 3a), the distribution remains completely within the dimension of the buffer: in this circumstance it is possible to narrow the band of the filter at will, since overflows will not occur anyway. In the second situation (FIG. 3b), the dimension of the buffer is not sufficient to contain the input data ranges, hence the band of the filter must be varied to follow the input jitter (even if as little as possible) and thus avoid overflow. In view of the consistency of the jitter of the networks which reference is made to, it is anyway unlikely to be in the first situation, unless one has remarkable amount of memory; and however, also in that circumstance, the method as disclosed herein works in an optimum manner.

The band-controlled parametric low-pass filter may, for instance, have an input-output relation of the type:

$$\phi_{out}[i]=p*\phi_{out}[i-1]+(1-p)*\phi_{in}[i] \quad (1)$$

where p denotes the pole of the filter; in this case the transfer function (H(z)) is:

$$H(z) = \frac{1-p}{1-p*z^{-1}}$$

In order to have the stability and the low-pass characteristic, the pole p should take values between 0 and 1, with a band which, the greater p, the narrower it will be.

Figure 4:
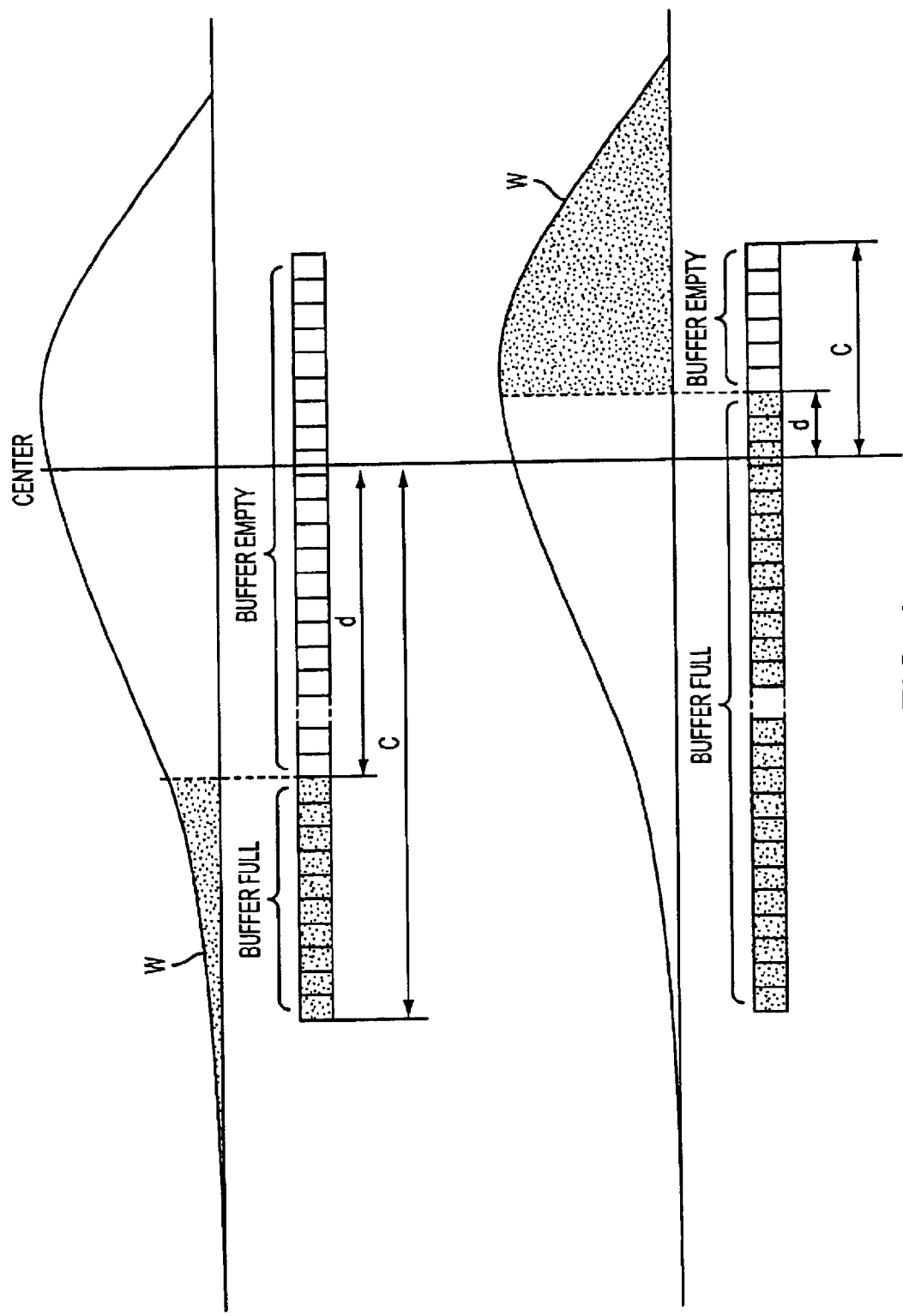
FIG. 4 shows two distributions of the filling level of the buffer partially full and partially empty, respectively.

The variation law of pole p will then determine the system adaptability to the distribution of the interarrival times and buffer distribution; in the implementation described herein a possible filter control law could be:

$$p = \frac{P}{1+k*R};$$

where:

P is the pole nominal value, i.e. the value obtainable in the absence of corrective actions by other blocks (D and E). It further determines the minimum band of the filter, in view of the fact that the other parameters k and R only tend to widen it;

R denotes the filter band adjusting factor and follows a law of the type:

$$R=r^n*W*B;$$

wherein:

r is a factor proportional to the buffer filling level, independent from its size: letting d be the distance (in terms of storage elements) between the effective filling of the buffer and the average of its distribution, and C the distance between the average and the end of the buffer from the same side of the current filling (FIG. 4), we have:

$$r = \frac{d}{C};$$

n is an integer weighting the factor r;

W denotes the residual probability of going towards overflow or underflow conditions; in FIG. 4 it is represented by the area beneath the distribution, from the current filling point to the probabilistically more remote point; note that W tends to decrease as the buffer approaches its ends: situations which are close to the maximum or minimum "filling" hence entail a narrowing of the band. This is sensible because, if the buffer distribution estimate is correct, the probability of further moving towards overflow/underflow conditions is lower and lower, while the probability of moving towards the center of the distribution is much higher. Anyway, in order to be protected from errors, it is possible to add a constant value to W which provides a minimum passband:

$$W'=W_{min}+W.$$

B is varied along with n to optimize the exploitation of the buffer and then make it have a filling level from 60% to 80%. Should the exploitation be lower, the band of the filter is narrowed; if the exploitation is higher than 80%, it is widened. Therefore one seeks to bring the exploitation near to the value of 70% which is regarded as the optimum one.

The relation defining R is maintained as the filling varies, provided that the latter stays within some predetermined exploitation limits (e.g. between 0 and 80%). If these limits are exceeded, this means that overflow/underflow conditions are being approached: in this circumstance it is necessary to widen the passband of the filter by suitably acting upon the value of k, as described later on, but also upon the value of R. In the embodiment described herein, when the filling of the buffer is between 80 and 85%, R has been chosen to vary according to a parabolic law between (0,8$^n$*W*B), as stated by the above relation, and a constant value amounting to some units, for instance 4 or 5, which is maintained in the entire filling range 85÷100%.

k represents the gain factor of R and is related to the overflow/underflow probability. It is calculated in such a way that the underflow/overflow probability stays below a pre-established value, e.g. $10^{-9}$. The computation of its value can be derived from an hypotesis of interarrival time distribution. A possible methodology related to the event of overflow will be set forth for simplicity, the one related to the event of underflow being substantially dual. It is to be noted that, in general, the entire system works on a discrete time basis, with a time slice $T_c$, that may not coincide with $T_s$, the source data transmission time slice (i.e. reciprocal of the source frequency). As a rule, in fact, the system works more slowly, particularly when such limitation is imposed by the quantity of calculations to be carried out at each iteration of the algorithms.

In a possible overflow situation it is necessary to establish the minimum interarrival time, $T_{min}$, of the incoming data whereby the residual space of the buffer becomes insufficient for containing them. Intuitively, it is a question of determining the maximum rate with which data could arrive in the interval $(n*T_c,(n+1)*T_c]$, rate for which the residual capacity of the buffer is insufficient for containing them.

The minimum arrival time must be calculated on a probabilistic basis: if a probability of overflow lower than $P_o$ is wished the smallest interarrival time having however a probability equal to $P_o$ should be taken into account (in fact, setting $T_m$ be equal to the smallest of the interarrival times means bringing the error probability to the least possible value, but also increasing the jitter, because the value of k would increase and widen the passband of the filter).

Given that the wished probabilities are on the order of $10^{-9}$ it is unpractical deriving $T_{min}$ from the distribution which has been estimated by block A, which provides only an approximation thereof. Hence it is preferable to use a digital method which exploits the parameters which have been computed by the input statistics, in particular the mean interarrival time $T_m$ and its standard deviation $\sigma$. Then the distribution of the sum of $N=int(T_c/T_{ss})$ interarrival times (assumed as independent and equally-distributed random variables), whose average will be $N*T_m$ and whose standard deviation will be $\sigma_N$, could be calculated; time T' is then calculated:

$$T'=N*T_m-c*\sigma_N$$

(where the factor c, which establishes the error probability, is worth e.g. 4 or 5) and it is established:

$$T_{min}=T'/N.$$

It is necessary to bear in mind that, while data are written at random intervals, they are also taken at intervals having a length $T_{ss}$ (which is the estimate of $T_s$ carried out by block B).

In view of what has been seen at the previous point, under the condition of exploitation above a certain threshold, R takes a constant value.

Operatively: i) at the instant $T_{n-1}=(n-1)*T_c$, the system measures the buffer filling level, and this exceeds the pre-established maximum threshold; ii) a constant value Ro is then imposed to R; iii) $T_{min}$ is calculated according to the procedure described above; iv) a number of data at the most equal to $N_{in}=T_c/T_{min}$ will arrive, with a pre-selected probability, in the time interval $[(n-1)*T_c,n*T_c]$; v) in the same time interval, $N_{out}=T_c/T_{ss}$ data will be extracted; obviously one goes towards the overflow condition if $N_{in}>N_{out}$;

In order that the filling level at the instant $T_n$ is not increasing with respect to the instant $T_{n-1}$, it is then necessary to impose in (1) that:

$$\varphi_{out}[n] = \frac{P}{1+R_o*k} *\varphi_{out}[n-1] + \left(1 - \frac{P}{1+R_o*k}\right)*\varphi_{in}[i] \geq$$
$$\varphi_{out}[n-1] + (N_{in} - N_{out});$$

with all parameters, but k, being known, one can proceed with the calculation of $k=k_0$ which equals the last two terms of the previous equation. The method is totally similar in the event of underflow, where the maximum interarrival time with pre-established probability will come into play, and the seeked value of $k=k_u$ will be obtained by the same method.

Constants $k_o$ and $k_u$, after all, permit of imposing a wished probability of overflow and underflow respectively, and must be re-calculated periodically as to remain updated with the more recent statistics of the input signal. It is anyway advisable for the system to use these two values of k only when it is in a condition of too great buffer exploitation (e.g. over 85%) and which uses on the contrary smaller values when it is far from such conditions so as to avoid an extreme widening of the filter band and thus an increase of the output jitter. A possible law of variation of factor k which is obtained by varying the exploitation of the buffer, s, could be, for the overflow:

$$K=K_{min}(0 \leq s \leq 75\%)$$

$$K=K_{min}+(s-0,75)*(k_o-k_{min})/0,1(75\%<s<85\%)$$

$$k=k_o(s>85\%)$$

and similarly for the underflow by replacing $k_o$ with $k_u$.

As mentioned, the proposed system can operate together with a PLL which can share the same physical buffer. This is necessary when the required accuracy is so stringent as to be unsatisfied by the proposed system alone: consider, for instance, the reconstruction of the reference synchronisms of an encoded video signal transmitted over SDH network with ATM.

In this circumstance, the system provides that $k_{conf}=1$ (or, more in general, $0<k_{conf}\leq 1$): the "statistical pointer" will no longer constitute the read out pointer of the buffer, but it will become the PLL input quantity; the PLL, as far as it is concerned, will take care of eliminating the residual jitter from the statistic pointer, due to the source only, but not to the network (in fact, the network jitter has already been eliminated by the proposed system).

The outgoing phase from the PLL will then constitute the buffer read out phase. A partial implementation of the system is also possible, a possible one, particularly useful when a coarse reduction of the network jitter is sufficient enough, being herein mentioned. The system should be configured as follows: i) $k_{conf}=0$; ii) block C is an all-pass filter (output=input); and iii) block D and E are eliminated.

The system thus obtained is a forward-control one; block B, basing itself upon the estimations of block A, upon the phase error and knowing the possible variation intervals of the quantities at stake, derived from the network and source characteristics which are known with a certain accuracy, can then approximate the source frequency. Obviously the accuracy thus obtained is less than the one of the complete system, but the consequent remarkable semplification is also to be taken into account.

Notwithstanding the method and device described above can be used in several fields where the numeric control of the buffer and of a phase-locked loop is required for asynchronous networks, they result to be particularly useful in the event of television signals as well.

From the above description of the performed functions and of the mode of operation, the actual realization of the circuit of the invention is not a problem for a person skilled in the art.

Finally, variations and modification of the present invention should be apparent to those of skill in the art without departing from the scope of the present invention without departing from the scope of the present invention as defined by the attached claims.

We claim:

1. A method for the numeric control of a buffer for asynchronous networks comprising:
    obtaining a statistical estimation of a received data flow temporal distribution by one or more of:
        carrying out a statistical estimation of the received data flow temporal distribution according to the input phase, or
        considering a model, known a priori, of the received data flow, and comparing said received data flow model with a statistical estimation of the received data flow temporal distribution carried out according to the input phase;
    obtaining an estimate of the source frequency and deriving one or more statistical parameters of said statistical estimation of the data temporal distribution;
    sending said source frequency estimate and said parameter(s) to one or more buffer control blocks defining a read out statistical pointer; and
    controlling the buffer through the input phase measured value;
    wherein the filling level, or level of use, of the buffer is kept within a range of between 50% and 90%.

2. A method according to claim 1, further comprising carrying out an estimation of the buffer distribution according to factors comprising at least one of the following factors:
    received data flow time distribution; buffer filling level; probability of error due to overflow or underflow; and degree of exploitation of buffer.

3. A method according to claim 1, further comprising filtering the ATM cell jitter in order to obtain a phase residual error.

4. A method according to claim 3, wherein the step of filtering the ATM cell jitter is carried out through a low-pass parametric filter whose filtering parameters are established on the basis of one or more factors comprising:
    time distribution of the received data flow;
    buffer filling level; probability of error due to overflow or underflow; and
    buffer exploitation degree.

5. A method according to claim 1, further comprising inserting a digital phase locked loop downstream of the system.

6. A phase-locked loop comprising means designed to implement the method of claim 1.

7. A method for the numeric control of a buffer for asynchronous networks, comprising:
    obtaining a statistical estimation of a received data flow temporal distribution by one or more of:
        carrying out a statistical estimation of the received data flow temporal distribution according to the input phase, or
        considering a model, known a priori, of the received data flow and comparing said received data flow model with a statistical estimation of the received data flow temporal distribution carried out according to the input phase;
    obtaining an estimate of the source frequency and deriving one or more statistical parameters of said statistical estimation of the data temporal distribution;
    sending said source frequency estimate and said parameter(s) to one or more buffer control blocks defining a read out statistical pointer;
    controlling the buffer through the input phase measured value; and
    driving a local oscillator through the source frequency estimation and a phase residual error of the system.

8. A method for the numeric control of a buffer for asynchronous networks, comprising:
    obtaining a statistical estimation of a received data flow temporal distribution by one or more of:
        carrying out a statistical estimation of the received data flow temporal distribution according to the input phase, or
        considering a model, known a priori, of the received data flow, and comparing said received data flow model with a statistical estimation of the received data flow temporal distribution carried out according to the input phase;
    obtaining an estimate of the source frequency and deriving one or more statistical parameters of said statistical estimation of the data temporal distribution;
    sending said source frequency estimate and said parameter(s) to one or more buffer control blocks defining a read out statistical pointer;
    controlling the buffer through the input phase measured value; and
    carrying out an algebraic sum of the input phase for computing the phase error.

9. A method for the numeric control of a buffer for asynchronous networks, comprising:
    obtaining a statistical estimation of a received data flow temporal distribution by one or more of:
        carrying out a statistical estimation of the received data flow temporal distribution according to the input phase, or
        considering a model, known a priori, of the received data flow, and comparing said received data flow model with a statistical estimation of the received data flow temporal distribution carried out according to the input phase;
    obtaining an estimate of the source frequency and deriving one or more statistical parameters of said statistical estimation of the data temporal distribution;
    sending said source frequency estimate and said parameter(s) to one or more buffer control blocks defining a read out statistical pointer; and
    controlling the buffer through the input phase measured value;
    wherein the step of carrying out a statistical estimation of the received data flow temporal distribution according to the input phase is accomplished through the histogram method.

10. A method according to claim 9, wherein the step of carrying out a statistical estimation through the histogram method comprises the following steps: i) establishing the interval [a,b) in which the measures should be kept; ii) subdividing the interval [a,b) in N subintervals of the same width equal to L=(b−a)/N so as to partition the interval as:

[a,a+L)∪[a+L,a+2L)∪[a+2L,a+3L)∪ ...

... ∪[a+(N−2),),a+(N−1)L)∪[a+(N−1)L,b);

or (−∞,a+L)∪[a+L,a+2L)∪[a+2L,a+3L)∪ ...

... ∪[a+(N−2)L),a+(N−1)L)∪[a+(N−1)L,∞)

when intervals (−∞,a) and [b,+∞) are included; iii) initializing to 1/N the N elements of a vector isto[N], each capable of collecting the frequencies relative to the corresponding interval; and iv) carrying out, for each measure x belonging to the i-th subinterval associated with isto[N], $$isto[j] = isto[j] * (1 - \alpha), \quad \forall\, j \neq i$$

$$isto[i] = 1 - \sum_{\forall j \neq i} isto[j],$$

where α denotes the histogram updating rate.

11. A method for the numeric control of a buffer for asynchronous networks comprising:

obtaining a statistical estimation of a received data flow temporal distribution by one or more of:
carrying out a statistical estimation of the received data flow temporal distribution according to the input phase, or
considering a model, known a priori, of the received data flow, and comparing said received data flow model with a statistical estimation of the received data flow temporal distribution carried out according to the input phase;

obtaining an estimate of the source frequency and deriving one or more statistical parameters of said statistical estimation of the data temporal distribution;

sending said source frequency estimate and said parameter(s) to one or more buffer control blocks defining a read out statistical pointer;

controlling the buffer through the input phase measured value; and filtering the ATM cell jitter in order to obtain a phase residual error;

wherein the step of filtering the ATM cell jitter provides for the use of a controlled-band parametric low-pass filter having an input-to-output relation of the type:

$$\phi_{out}[i] = p * \phi_{out}[i-1] + (1-p) * \phi_{in}[i]$$

where p denotes the pole of the filter and has a value between 0 and 1.

12. A device for the numeric control of the buffer for asynchronous networks, comprising:

means for obtaining a statistical estimation of a received data flow temporal distribution by one or more of:
carrying out a statistical estimation of the received data flow time distribution according to the input phase, or
providing a model, known in advance, of the received data flow and comparing said received data flow model with a statistical estimation of the received data flow time distribution carried out according to the input phase;

means for deducing a source frequency estimation and obtaining one or more statistical parameters of said data time distribution statistical estimation;

means for sending said source frequency estimation and said one or more parameters to one or more blocks for the buffer control which define a read out statistical pointer;

means for controlling the buffer through the input phase measured value; and means for carrying out an algebraic sum of the input phase to compute the phase error.

13. A device for the numeric control of the buffer for asynchronous networks, comprising:

means for obtaining a statistical estimation of a received data flow temporal distribution by one or more of:
carrying out a statistical estimation of the received data flow time distribution according to the input phase, or providing a model, known in advance, of the received data flow and comparing said received data flow model with a statistical estimation of the received data flow time distribution carried out according to the input phase:

means for deducing a source frequency estimation and obtaining one or more statistical parameters of said data time distribution statistical estimation;

means for sending said source frequency estimation and said one or more parameters to one or more blocks for the buffer control which define a read out statistical pointer;

means for controlling the buffer through the input phase measured value; and means for driving a local oscillator through the source frequency estimation and a residual phase error of the system.

14. A device according to claim 13, further comprising means for carrying out a buffer distribution estimation according to factors comprising at least one of the following factors:

received data flow time distribution;
buffer filling level;
probability of error due to overflow or underflow; and
degree of buffer exploitation.

15. A device according to claim 13, further comprising means for filtering the ATM cell jitter to deduce a phase residual error.

16. A device according to claim 15, wherein:
said filtering means is a parametric low-pass filter, and
the filtering parameters of said filtering means are established according to one or more factors comprising the following factors:
received data flow time distribution;
buffer filling level;
overflow/underflow error probability; and
degree of buffer exploitation.

17. A device according to claim 13, characterized in that it further comprises a digital phase locked-loop eliminating residual jitter.

18. A phase-locked loop comprising means in accordance with claim 13.

* * * * *